United States Patent
Mori et al.

(10) Patent No.: US 7,353,705 B2
(45) Date of Patent: Apr. 8, 2008

(54) OSCILLATION TYPE INERTIAL FORCE SENSOR

(75) Inventors: Akira Mori, Nagaokakyo (JP); Iku Nagai, Kawasaki (JP); Kazushige Sawada, Atsugi (JP); Makoto Narita, Yokohama (JP)

(73) Assignees: Murata Manufacturing Co., Ltd., Kyoto (JP); Asahi Kasei EMD Corporation, Tokyo (JP)

( * ) Notice: Subject to any disclaimer, the term of this patent is extended or adjusted under 35 U.S.C. 154(b) by 0 days.

(21) Appl. No.: 11/682,990

(22) Filed: Mar. 7, 2007

(65) Prior Publication Data

US 2007/0144256 A1 Jun. 28, 2007

Related U.S. Application Data

(63) Continuation of application No. PCT/JP2005/016549, filed on Sep. 8, 2005.

(30) Foreign Application Priority Data

Sep. 9, 2004 (JP) .............................. 2004-262930

(51) Int. Cl.
  *G01P 9/04* (2006.01)
  *G01P 19/56* (2006.01)
(52) U.S. Cl. .................................................. 73/504.12
(58) Field of Classification Search ..............................
  73/504.02–504.04, 504.12, 504.13, 504.14,
  73/504.15, 504.16, 1.37, 1.38, 1.77, 1.78
See application file for complete search history.

(56) References Cited

U.S. PATENT DOCUMENTS

| 5,902,931 | A | 5/1999 | Mori et al. | |
| 6,553,835 | B1 * | 4/2003 | Hobbs et al. | ............. 73/514.16 |
| 7,124,632 | B2 * | 10/2006 | Smith | ...................... 73/504.02 |

FOREIGN PATENT DOCUMENTS

| JP | 06-102046 A | 4/1994 |
| JP | 09-292231 A | 11/1997 |
| JP | 09-297028 A | 11/1997 |
| JP | 10-221083 A | 8/1998 |
| JP | 2003-065767 A | 3/2003 |

OTHER PUBLICATIONS

Official Communication for PCT Application No. PCT/JP2005/016549; mailed on Dec. 13, 2005.

* cited by examiner

*Primary Examiner*—Helen C. Kwok
(74) *Attorney, Agent, or Firm*—Keating & Bennett, LLP

(57) ABSTRACT

The oscillation type inertial force sensor includes an oscillator arranged to detect an inertial force, an oscillation circuit unit arranged to drive the oscillator, and a signal processing circuit unit arranged to generate a signal according to the magnitude of the inertial force on the basis of a detection output of the oscillator, and further includes a holding arranged to hold a processed signal in the signal processing circuit unit at a predetermined potential during a period immediately after power-on until operation of the oscillation circuit unit becomes stable in response to power-on.

5 Claims, 5 Drawing Sheets

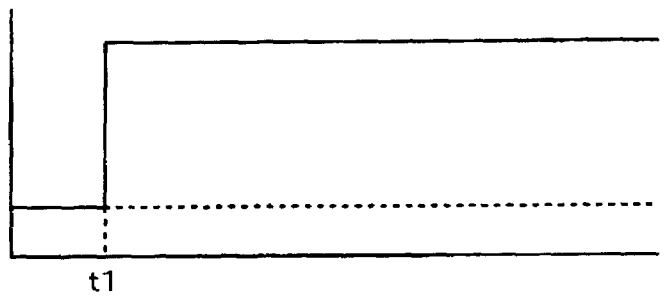
FIG. 2A power source voltage
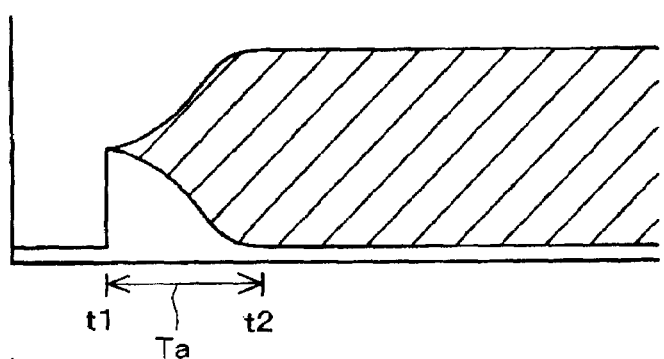
FIG. 2B drive signal waveform
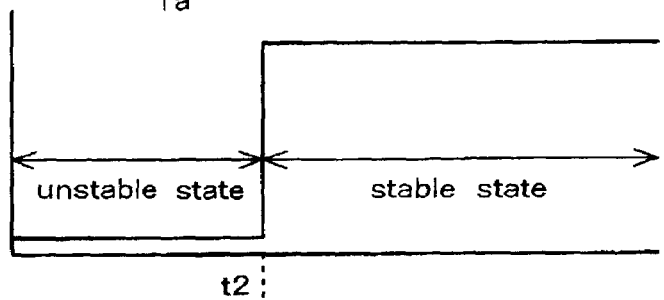
FIG. 2C amplitude determination output
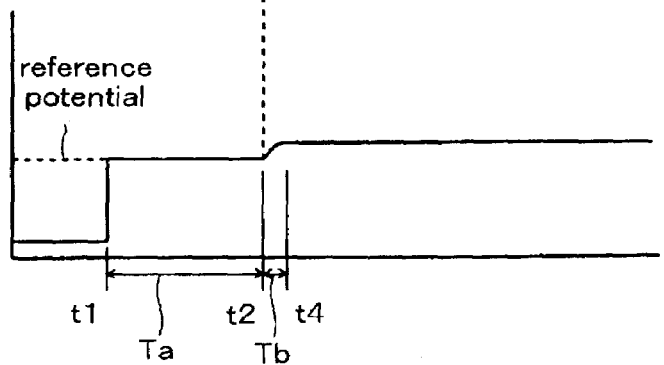
FIG. 2D angular rate signal output

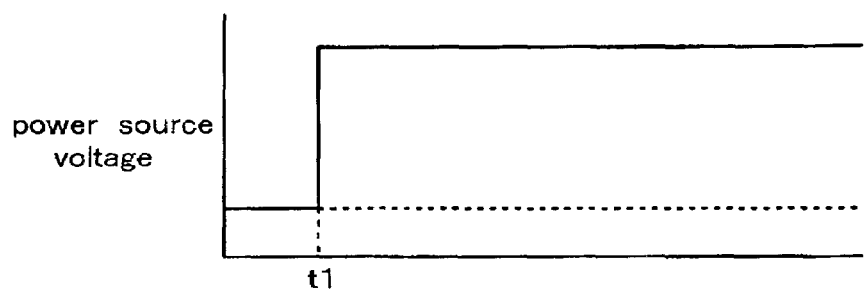
FIG. 5A PRIOR ART power source voltage
t1
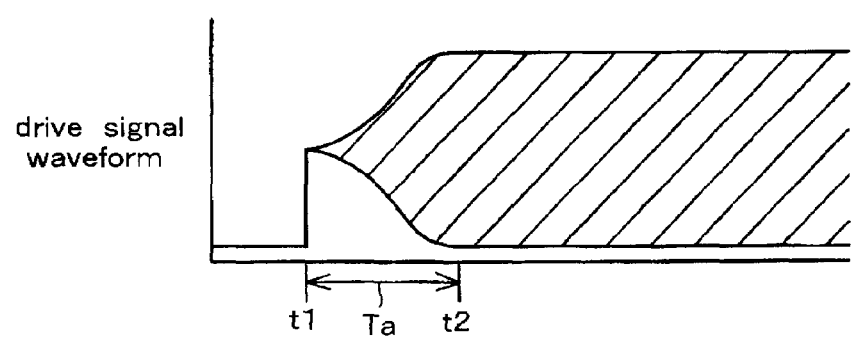
FIG. 5B PRIOR ART drive signal waveform
t1  Ta  t2
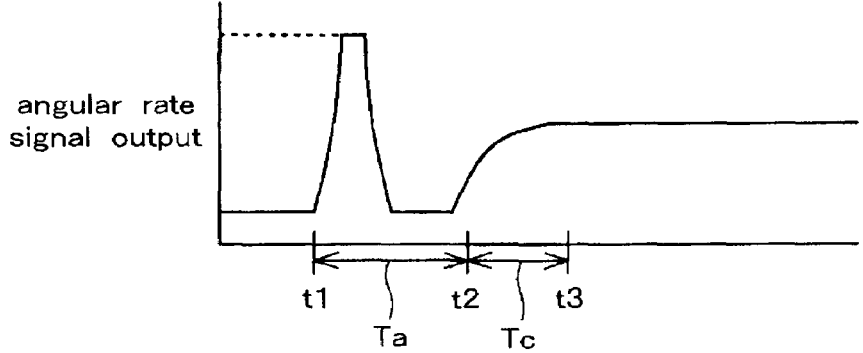
FIG. 5C PRIOR ART angular rate signal output
t1  Ta  t2  Tc  t3

OSCILLATION TYPE INERTIAL FORCE SENSOR

BACKGROUND OF THE INVENTION

1. Field of the Invention

The present invention relates to an inertial force sensor for detecting an inertial force and, more particularly, to an oscillation type inertial force sensor for detecting an inertial force by using an oscillator.

2. Description of the Related Art

A conventional oscillation type inertial force sensor has, for example, a configuration as shown in FIG. 4 (refer to, for example, Japanese Patent Laid-Open Nos. H10-221083 and H9-292231).

The oscillation type inertial force sensor is used as an angular rate sensor for detecting an angular rate as an inertial force, and includes an oscillator 1 for detecting an angular rate, an oscillation circuit unit 2 for driving the oscillator 1, and a signal processing circuit unit 3 for generating an angular rate signal having a direct current voltage according to the angular rate on the basis of a detection output of the oscillator 1. Although an electrostatic capacitance detection type is provided as the oscillator 1, a piezoelectric drive/piezoelectric detection type oscillator (fork oscillator, tuning bar vibrator, or other suitable structure) may be used. The oscillation circuit unit 2 is a closed loop self-excited oscillator including the oscillator 1 as a resonance element.

In the oscillation type inertial force sensor having the above-described configuration, an oscillation output of the oscillation circuit unit 2 is provided as a drive signal for the oscillator 1. In response to the drive signal, the oscillator 1 oscillates in a predetermined drive direction and a signal corresponding to an oscillation amount in the drive direction is fed back to the oscillation circuit unit 2. Consequently, the oscillation circuit unit 2 oscillates by itself, and the drive signal is again provided to the oscillator 1. As a result, the oscillation of the oscillator 1 is maintained at approximately a self-resonant frequency.

When a rotation angular rate using an angular rate detection axis of the oscillator 1 as a rotation axis is applied, a Coriolis force is generated in a direction orthogonal to the drive direction, and the drive direction of the oscillator 1 changes. A vibration displacement due to the Coriolis force is detected by the oscillator 1 and input to the signal processing circuit unit 3. The signal processing circuit unit 3 performs predetermined signal processes, such as signal conversion, synchronous detection, smoothing, and other suitable signal processes based on a detection output of the oscillator 1 and extracts an angular rate signal having a direct current voltage corresponding to the angular rate.

In the conventional oscillation type inertial force sensor shown in FIG. 4, hundreds of microseconds (period Ta in FIG. 5B) are required after power-on (time t1 in FIG. 5A) until the oscillation output of the oscillation circuit unit 2 becomes stable (time t2 in FIG. 5B). In the period Ta, the voltage of the drive signal applied to the oscillator 1 is in an unstable state.

In the state where the voltage is unstable, that is, in the unstable period Ta, the drive state of the oscillator 1 is also unstable so that the detection output of the oscillator 1 includes a large error signal. Therefore, the angular rate signal from the signal processing circuit unit 3 is highly disturbed and the output fluctuates dramatically (refer to FIG. 5C).

The signal processing circuit unit 3 includes a smoothing circuit for smoothing an output subjected to synchronous detection simultaneously with the oscillation frequency of the oscillation circuit unit 2. A certain time is required until an output of the smoothing circuit is stabilized. For example, the smoothing circuit is usually set in a cutoff frequency of about 10 Hz to about 50 Hz, and has a time constant of about 16 ms to about 3 ms.

In the conventional oscillation type inertial force sensor, a signal which is input to the smoothing circuit is highly disturbed during the period Ta in which an oscillation output is unstable. Consequently, after the unstable period Ta of the oscillation circuit unit 2, a certain time (period Tc in FIG. 5C) is required until an output of the smoothing circuit is actually stable.

As described above, the conventional oscillation type inertial force sensor has a problem in that a predetermined period (Ta+Tc) is required after power-on until an output of the signal processing circuit unit 3 becomes stable. Moreover, the time (time t3 in FIG. 5C) at which the output of the signal processing circuit unit 3 becomes stable is unclear to the user. It is difficult to determine when measurement of an angular rate, that is, use of an output signal should begin. Consequently, when measurement of an angular rate begins abruptly during the period from power-on until an output of the signal processing circuit unit 3 is stabilized, a large error may be produced. Thus, the angular rate cannot be detected with high precision.

It is also possible to show the time from power-on to when an output of the signal processing circuit unit 3 becomes stable and alert the user not to measure the angular rate until the time elapses by a product specification or other suitable information. However, this is not preferable because an extra load would be applied to the user side.

SUMMARY OF THE INVENTION

To overcome the problems described above, preferred embodiments of the present invention provide an oscillation type inertial force sensor capable of promptly starting measurement by shortening a period from power-on to when a signal output becomes stable, which can also clearly recognize from outside that the signal output has become stable and, even when measurement begins abruptly in an unstable state, minimizing occurrence of a measurement error.

A preferred embodiment of the present invention provides an oscillation type inertial force sensor including an oscillator arranged to detect an inertial force, an oscillation circuit unit arranged to drive the oscillator, and a signal processing circuit unit arranged to generate a signal according to the magnitude of the inertial force based on a detection output of the oscillator, and includes the following configuration.

Specifically, an oscillation type inertial force sensor according to a preferred embodiment of the present invention includes an oscillator arranged to detect an inertial force, an oscillation circuit unit arranged to drive the oscillator, and a signal processing circuit unit arranged to generate a signal corresponding to the magnitude of the inertial force based on a detection output of the oscillator, and includes a holding unit arranged to hold a processed signal in the signal processing circuit unit at a predetermined potential during a period immediately after power-on until operation of the oscillation circuit unit becomes stable in response to power-on.

The signal processing circuit unit preferably includes at least a synchronous detection circuit arranged to synchronous-detect a detection output of the oscillator, and a smoothing circuit arranged to smooth an output of the synchronous detection circuit, and the holding unit holds a processed signal at a predetermined potential in a stage before the smoothing circuit in the signal processing circuit unit.

The holding unit preferably includes an amplitude determining circuit arranged to monitor signal amplitude of the oscillation circuit unit and to perform a control so that the processed signal is held at a predetermined potential until the signal amplitude becomes equal to or greater than a predetermined value.

The holding unit preferably includes a timer circuit arranged to count the time from power-on and to perform a control so that the processed signal is held at a predetermined potential until a predetermined time elapses.

The predetermined potential held by the holding unit is preferably set to correspond with a potential obtained as an output of the signal processing circuit unit when no inertial force is detected.

The holding unit preferably includes a status notification output terminal arranged to indicate when an oscillation state of the oscillation circuit unit is stabilized.

The oscillation type inertial force sensor according to preferred embodiments of the present invention includes a holding unit arranged to hold a processed signal in the signal processing circuit unit at a predetermined potential during a period immediately after power-on until operation of the oscillation circuit unit becomes stable. Consequently, a processed signal in the signal processing circuit unit is held at a predetermined potential during a period in which the oscillation state of the oscillator is unstable, and an output of the signal processing circuit unit is also held at a constant potential. Therefore, even when a signal is measured abruptly in the unstable period, an occurrence of an error is suppressed to the minimum value. Thus, problems in that a large error occurs and measurement precision deteriorates and an output of the signal processing circuit unit is saturated and measurement cannot be performed are reliably prevented.

When the signal processing circuit unit includes at least a synchronous detection circuit arranged to synchronous-detect a detection output of the oscillator, and a smoothing circuit arranged to smooth an output of the synchronous detection circuit, as in the oscillation type inertial force sensor described above, when the holding init holds a processed signal at a predetermined potential in a stage before the smoothing circuit in the signal processing circuit unit, since a signal held at the predetermined potential is also input to the smoothing circuit in the period in which the oscillation state of the oscillator is unstable, the oscillation state of the oscillator shifts to a stable state, and the unstable period of the smoothing circuit when holding of the predetermined potential is stopped is shortened. Therefore, the entire time from power-on until an output of the signal processing circuit unit becomes stable is shortened, and measurement can be started promptly.

When the oscillation type inertial force sensor does not include the holding unit, if an error in the sensor output increases even for a short period, even when the sensor output is subsequently switched to a sensor output having a small error, a period of time is required until a signal recovers to a correct value. Where the correct sensor output is about 0 mV and the sensor output is about 1000 mV just before switching, a period of time corresponding to the time constant of the smoothing circuit is required for the sensor output to recover from about 1000 mV to a value of about 0 mV, for example, about 5 mV or less.

On the other hand, where an error of the sensor output is not very large, when the output is switched to an output with a small error, a long period of time is not required for the signal to recover to the correct value. When the correct sensor output is about 0 mV and the sensor output is about 10 mV just before the switch, to recover from about 10 mV to a value of about 0 mV, for example, about 5 mV or less, a shorter time is required as compared to when the sensor output recovers from about 1000 mV to a value of about 0 mV, for example, about 5 mV or less.

As described above, when the holding unit is not provided, the time required to regain a correct output fluctuates in accordance with the magnitude of an error just before a correct output is provided. When an error just before the switch is large, a long time is required to regain a correct output.

In contrast, when the holding unit is provided, irrespective of an output from the oscillator, an input of the smoothing circuit has a value close to a correct output. That is, in the above-described example, the value just before the switch to an output with a small error (correct value) is always about 10 mV. As compared to when no holding unit is provided and a sensor output temporarily becomes an output with a large error, for example, about 1000 mV, the period of time until an output becomes stable is substantially and reliably shortened, and measurement can be promptly started.

When the holding unit includes an amplitude determining circuit arranged to monitor the signal amplitude of the oscillation circuit unit and to perform a control so that the processed signal is held at a predetermined potential until the signal amplitude becomes equal to or greater than a predetermined value, as in the oscillation type inertial force sensor described above, the signal amplitude of the oscillation circuit unit is monitored by the amplitude determining circuit. Consequently, the period from power-on until the oscillation state of the oscillator becomes stable can be reliably detected. Therefore, even when the period from power-on until the oscillation state of the oscillator becomes stable varies among products or production lots, or due to use conditions, the processed signal in the signal processing circuit unit can be reliably held at the predetermined potential during the period from power-on until the oscillation state of the oscillator becomes stable. Thus, the reliability is further improved.

When the period from power-on until the oscillation state of the oscillator becomes stable does not substantially vary and can be predicted, it is unnecessary to provide the amplitude determining circuit. With the configuration in which the holding unit includes a timer circuit arranged to count the time from power-on and to perform a control so that the processed signal is held at a predetermined potential until predetermined time elapses, as in the oscillation type inertial force sensor described above, the timer circuit counts the time from power-on, and the processed signal in the signal processing circuit unit can be held at a predetermined potential during the period from power-on until predetermined time elapses.

When the predetermined potential held by the holding unit is set corresponding to a potential obtained as an output of the signal processing circuit unit when no inertial force is detected, as in the oscillation type inertial force sensor described above, even when signal measurement is performed abruptly in the period in which the state of the oscillation circuit unit is unstable, occurrence of an error is suppressed to the minimum. Specifically, a device using the oscillation type inertial force sensor, such as a video camera or a car navigation system, is usually in an almost stationary state for a period of time after power-on. Therefore, by preliminarily setting the predetermined potential held by the holding unit to a value corresponding to a potential obtained as an output of the signal processing circuit unit when no inertial force is detected, a measurement output according to use conditions of the device is generated from the signal processing circuit unit. Thus, even if an accurate measurement output cannot be obtained during the unstable period, occurrence of a problem is suppressed.

When the holding unit includes a status notification output terminal arranged to indicate that an oscillation state of the oscillation circuit unit is stabilized, as in the oscillation type inertial force sensor described above, the user can clearly determine the timing at which an output of the signal processing circuit unit is stabilized. Therefore, the user can reliably determine the start timing of measurement, so that occurrences of trouble such that measurement is started abruptly in a state in which an output of the signal processing circuit unit is unstable after power-on can be prevented, and reliability is improved.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 2A to 2D are time charts provided for explaining operations of the oscillation type inertial force sensor shown in FIG. 1.

FIGS. 5A to 5C are time charts provided for explaining operations of the conventional oscillation type inertial force sensor shown in FIG. 4.

DETAILED DESCRIPTION OF PREFERRED EMBODIMENTS

Preferred embodiments of the present invention will be described below more specifically.

First Preferred Embodiment

Figure 1:
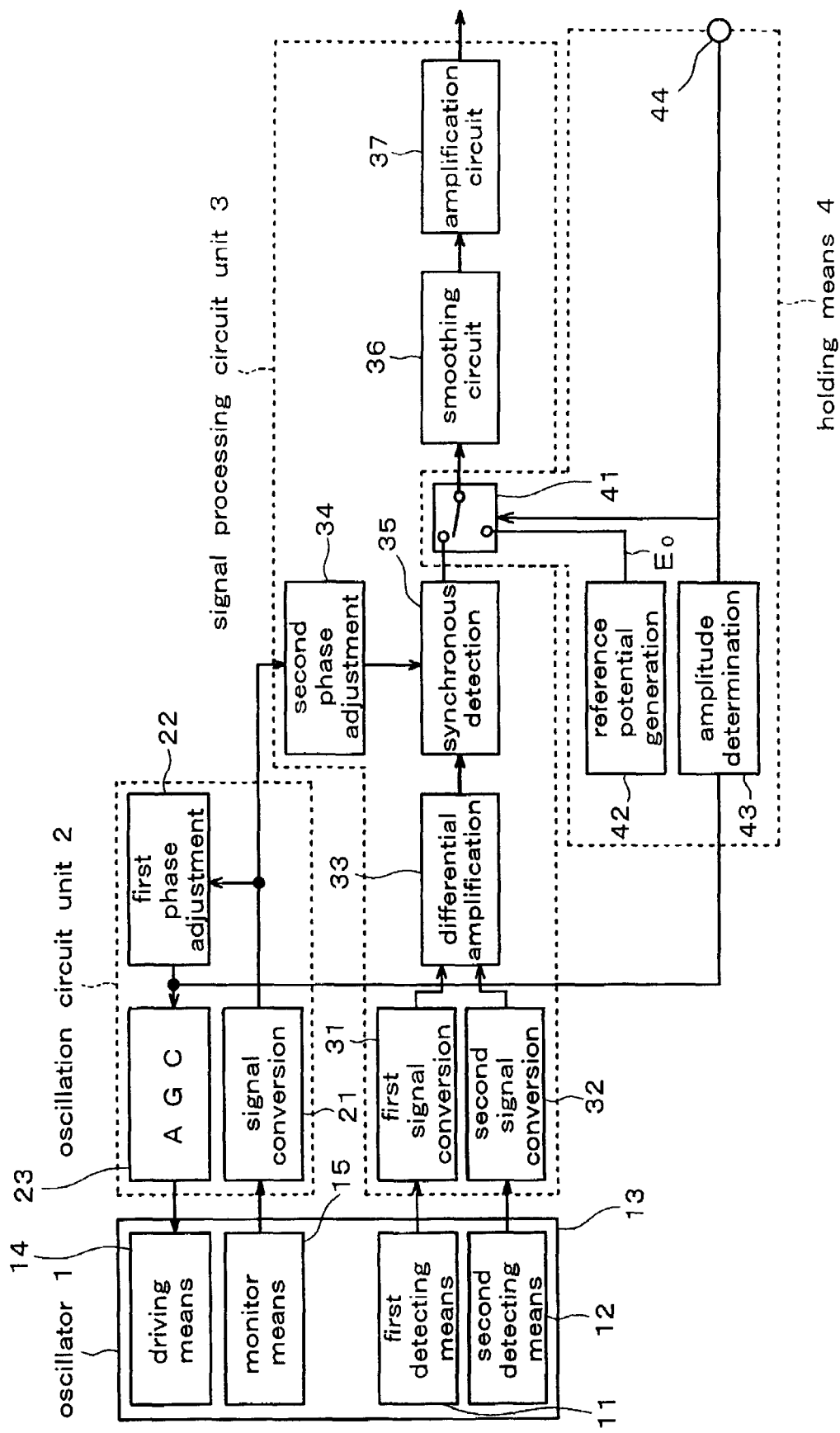
FIG. 1 is a block diagram showing the configuration of an oscillation type inertial force sensor according to a first preferred embodiment of the present invention.

FIG. 1 is a block diagram showing the configuration of an oscillation type inertial force sensor according to a first preferred embodiment of the invention.

The oscillation type inertial force sensor of the first preferred embodiment is used as an angular rate sensor for detecting an angular rate as an inertial force and includes an oscillator 1 arranged to detect an angular rate, an oscillation circuit unit 2 arranged to drive the oscillator 1, and a signal processing circuit unit 3 arranged to generate an angular rate signal according to the angular rate on the basis of a detection output of the oscillator 1.

In the first preferred embodiment, the oscillator 1 is an electrostatic capacitance detection type oscillator and includes an oscillating body 13, a driving unit 14 arranged to drive the oscillating body 13, a monitor unit 15 arranged to monitor an oscillation state of the oscillating body 13 and to feed back the monitor result to the oscillation circuit unit 2, and first and second detecting units 11 and 12 arranged detect vibration displacement due to the Coriolis force of the oscillating body 13. The oscillating body 13 is made of an oscillation substrate made of a silicon material, a glass material, or other suitable material. The driving unit 14 is defined by a drive electrode. The monitor unit 15 is defined by a monitor electrode. Each of the first and second detecting units 11 and 12 is defined by a detection electrode.

The oscillation circuit unit 2 acts as a self-excited oscillation circuit of a closed loop using the oscillator 1 as a resonance element, and includes a signal converting circuit 21, a first phase adjustment circuit 22, and an AGC circuit 23.

Since a monitor signal output of the monitor unit 15 in the oscillator 1 indicates a change in electrostatic capacitance, a C-V converting circuit for converting a capacitance change amount to a voltage corresponding to the capacitance change amount is used as the signal converting circuit 21. The first phase adjustment circuit 22 adjusts the phase of the monitor signal output from the signal converting circuit 21 so that self-oscillation can be performed. The AGC circuit 23 adjusts the amplitude of the output signal from the first phase adjustment circuit 22 to a voltage of a constant level, and outputs the resultant signal as a drive signal to the driving unit 14. An output of the signal converting circuit 21 is also supplied to a second phase adjustment circuit 34 in the signal processing circuit unit 3.

The signal processing circuit unit 3 includes first and second signal converting circuits 31 and 32, a differential amplification circuit 33, the second phase adjustment circuit 34, a synchronous detection circuit 35, a smoothing circuit 36, and an amplification circuit 37.

The first and second signal converting circuits 31 and 32 convert a detection signal output from the oscillator 1 so as to be adapted to signal processes. Where the oscillator 1 is an electrostatic capacitance detection type oscillator, an output of each of the first and second detecting units 11 and 12 is detected as a change amount of the electrostatic capacitance. Consequently, each of the first and second signal converting circuits 31 and 32 is defined by a C-V converting circuit for converting an electrostatic capacitance change amount to a voltage corresponding to the electrostatic capacitance change amount.

The differential amplification circuit 33 amplifies the difference between output signals from the first and second signal converting circuits 31 and 32. The output signals from the signal converting circuits 31 and 32 have phases opposite to each other and are converted to a single voltage signal corresponding to the Coriolis force by the differential amplification circuit 33.

The second phase adjustment circuit 34 adjusts the phase of the monitor signal output from the signal converting circuit 21 of the oscillation circuit unit 2 to a phase adapted to perform synchronous detection on an output signal from the differential amplification circuit 33. The synchronous detection circuit 35 performs synchronous detection on the output signal from the second phase adjustment circuit 34 as a reference phase, thereby obtaining an angular rate signal corresponding to the angular rate. Since the angular rate signal subjected to the synchronous detection in the synchronous detection circuit 35 is in a half-wave rectified state, the smoothing circuit 36 smoothes the angular rate signal to a DC voltage according to the angular rate. The amplification circuit 37 direct-current-amplifies the angular rate signal smoothed by the smoothing circuit 36 and outputs the amplified signal.

Furthermore, the oscillation type inertial force sensor of the first preferred embodiment includes a holding unit 4 arranged to hold a process signal in the signal processing circuit unit 3 to a predetermined potential during a period from immediately after power-on until the oscillation circuit unit 2 becomes a stable state in accordance with power-on.

The holding unit 4 includes a reference potential generating circuit 42, an amplitude determining circuit 43, a switching circuit 41, and a status notification output terminal 44. The reference potential generating circuit 42 generates a predetermined reference potential Eo. The reference potential Eo in this case is set in correspondence with a potential obtained as an output of the signal processing circuit unit 3 at the time of no rotation in which no rotation angular rate is applied to the oscillator 1.

For example, where a DC voltage signal output from the signal processing circuit unit 3 is in the range of about 0V to about 5V, where 2.5V indicates no rotation as a center, the reference potential Eo of the reference potential generating circuit 42 is set so that +2.5V corresponding to no rotation is output from the signal processing circuit unit 3 in a hold state.

The amplitude determining circuit 43 monitors the amplitude of an output signal of the first phase adjustment circuit 22 in the oscillation circuit unit 2 and determines whether the signal amplitude is equal to or greater than a predetermined value. The switching circuit 41 is provided between the synchronous detection circuit 35 at the ante stage of the smoothing circuit 36 and the smoothing circuit 36. When a status signal indicating that the oscillation circuit unit 2 is stabilized is output from the amplitude determining circuit 43, the switching circuit 41 switches a connection state from a state in which the reference potential generating circuit 42 and the smoothing circuit 36 are connected to each other to a state in which the synchronous detection circuit 35 and the smoothing circuit 36 are connected to each other. From the status notification output terminal 44, a status signal indicating that the oscillation state of the oscillation circuit unit 2 is stabilized is output from the amplitude determining circuit 43.

The operation of the oscillation type inertial force sensor having the above-described configuration will now be described with reference to the time chart of FIGS. 2A to 2D.

At power-on, a drive signal is output from the oscillation circuit unit 2 to the driving unit 14 in the oscillator 1. Consequently, the oscillator 1 is oscillated in a predetermined drive direction, and an output signal from the first phase adjustment circuit 22 is input to the amplitude determining circuit 43. The amplitude determining circuit 43 determines whether the waveform amplitude of the output signal of the first phase adjustment circuit 22 is equal to or greater than a predetermined value.

Since the operation of the oscillation circuit unit 2 is unstable for a period of time (the period Ta in FIG. 2B) after power-on (time t1 in FIG. 2A), a voltage of a drive signal applied to the driving unit 14 in the oscillator 1 is also in an unstable state. At this time, the waveform amplitude of an output signal of the first phase adjustment circuit 22 is less than the predetermined value, so that no signal is output from the amplitude determining circuit 43 (refer to FIG. 2C).

In this case, the reference potential generating circuit 42 is connected to the smoothing circuit 36 by the switching circuit 41, so that the predetermined reference potential Eo generated by the reference potential generating circuit 42 is output via the smoothing circuit 36 and the amplification circuit 37. Consequently, an output of the signal processing circuit unit 3 is held at a constant potential corresponding to the time of no rotation, for example, at about 2.5V as described above.

After that, when the operation of the oscillation circuit unit 2 is stabilized after a lapse of time, the waveform amplitude of the output signal of the first phase adjustment circuit 22 becomes equal to or greater than the predetermined value (time t2 in FIG. 2B). Accordingly, a high-level status signal indicating that the oscillation circuit unit 2 is stabilized is output from the amplitude determining circuit 43 (refer to FIG. 2C). The switching circuit 41 is switched by the status signal, and the synchronous detection circuit 35 is connected to the smoothing circuit 36. Consequently, an angular rate can be measured. Since the status signal output from the amplitude determining circuit 43 is applied to the status notification output terminal 44, the fact that the oscillation status of the oscillation circuit unit 2 is stabilized is indicated.

In the oscillation type inertial force sensor according to preferred embodiments of the invention, a drive signal is supplied to the driving unit 14 in the oscillator 1, so that the oscillating body 13 oscillates in a predetermined drive direction and a monitor signal according to the oscillation in the drive direction is output from the monitor unit 15. Since the monitor signal is fed back to the oscillation circuit unit 2, the oscillation circuit unit 2 self-oscillates by the monitor signal, and the drive signal is applied again to the driving unit 14. Consequently, the oscillating body 13 of the oscillator 1 continuously and stably oscillates at a resonance frequency which is the substantially same frequency as that of the drive signal output from the oscillation circuit unit 2.

When a rotation angular rate is applied to the angular rate detection axis of the oscillator 1 in this state, a Coriolis force is generated in a direction orthogonal to the drive direction, and the oscillation direction of the oscillator 1 changes. A vibration displacement due to the Coriolis force is detected by the first and second detecting units 11 and 12, and is input to the signal processing circuit unit 3.

The first and second signal converting circuits 31 and 32 in the signal processing circuit unit 3 convert an electrostatic capacitance change detected by the first and second detecting units 11 and 12 in the oscillator 1 to a voltage signal corresponding to the magnitude of the change. Subsequently, both signals are amplified by the differential amplification circuit 33, and the resultant single signal is input to the synchronous detection circuit 35. The synchronous detection circuit 35 detects the differential-amplified signal synchronously with an output signal of the second phase adjustment circuit 34 as a reference phase, so that an angular rate signal corresponding to the Coriolis force is obtained from the synchronous detection circuit 35.

In the conventional oscillation type inertial force sensor, the angular rate signal output from the signal processing circuit unit 3 is disturbed to a large extent and output fluctuations occur during the period in which the oscillation state of the oscillator 1 is unstable (refer to FIG. 5(c)). In contrast, in the oscillation type inertial force sensor of the first preferred embodiment, the signal having the predetermined reference potential Eo is supplied from the reference potential generating circuit 42 to the smoothing circuit 36 during the period in which the oscillation state of the oscillator 1 is unstable, so that an output of the signal processing circuit unit 3 is held at a constant potential corresponding to no rotation (refer to FIG. 2D). Therefore, problems, such as large fluctuations in the output of the signal processing circuit unit 3 do not occur, and an error is suppressed to a minimum.

When the oscillation state of the oscillation circuit unit 2 is stabilized, this fact is indicated via the status notification output terminal 44. The user can reliably determine the timing of start of measurement, and a problem in that measurement of an angular rate abruptly starts in a state in which an output of the signal processing circuit unit 3 is unstable is prevented.

Moreover, the predetermined reference potential Eo is also applied to the smoothing circuit 36 in the period in which the oscillation state of the oscillator 1 is unstable, the unstable period (period Tb in FIG. 2D) of the smoothing circuit 36 when the oscillation state of the oscillator 1 enters the stable state is shortened. Therefore, the overall time (Ta+Tb) from power-on until an output of the signal processing circuit unit 3 is stabilized is shortened to less than that in the conventional technique, and measurement of an angular rate can be promptly started.

After the oscillation output of the oscillation circuit unit 2 is stabilized as described above, the angular rate signal based on the Coriolis force taken from the synchronous detection circuit 35 is in a half-wave rectified state. Consequently, the angular rate signal is input to the smoothing circuit 36 via the switching circuit 41 and smoothed to a DC voltage according to the angular rate. Furthermore, the angular rate signal is amplified by the amplification circuit 37, and the amplified signal is output.

Although the amplitude determining circuit 43 determines the amplitude of the output signal of the first phase adjustment circuit 22 in the first preferred embodiment, the invention is not limited to this configuration. Alternatively, the amplitude of an output of the AGC circuit 23 or the amplitude of an output of the signal converting circuit 21 may be monitored.

Second Preferred Embodiment

Figure 3:
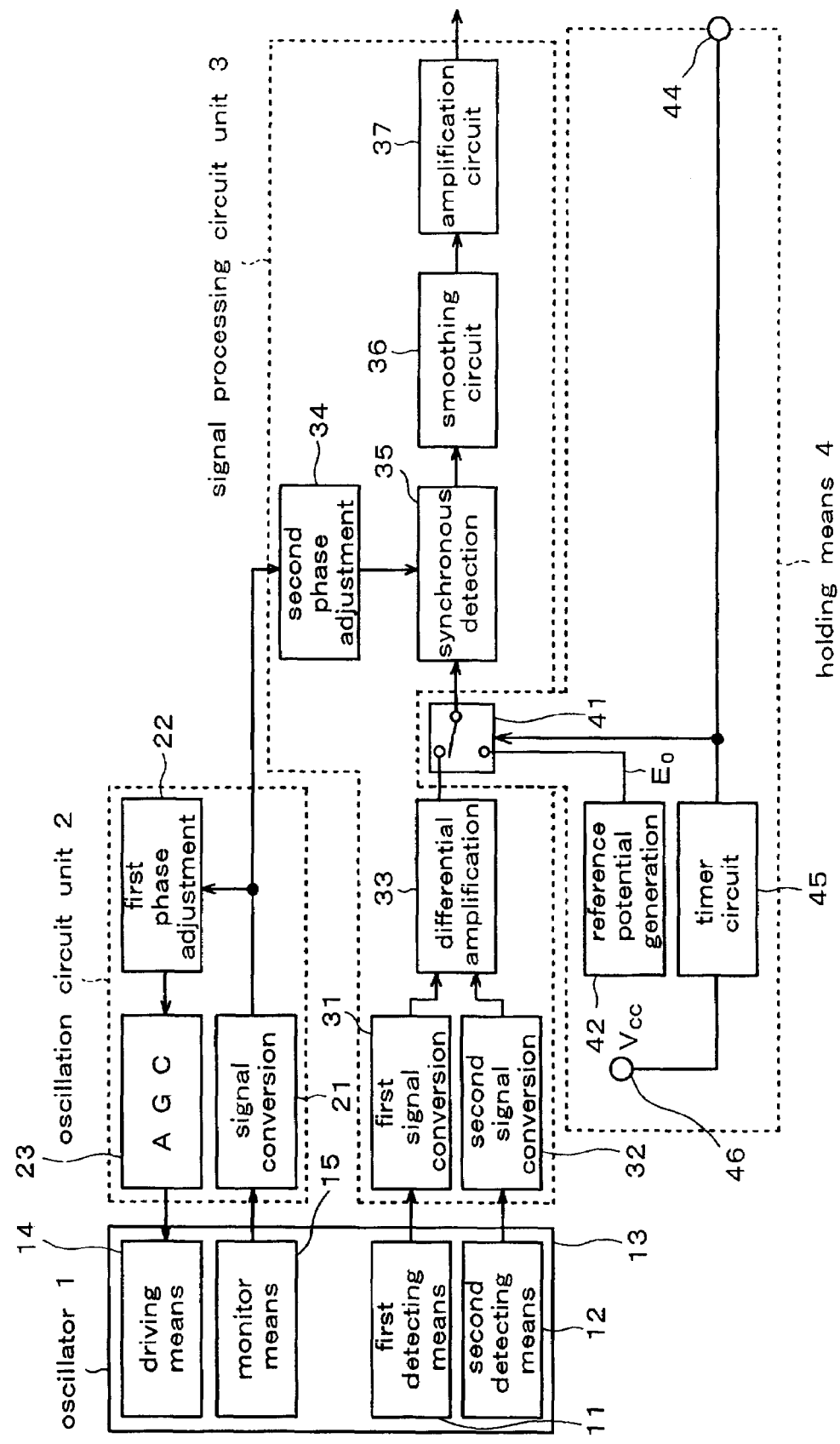
FIG. 3 is a block diagram showing the configuration of an oscillation type inertial force sensor according to a second preferred embodiment of the present invention.
Figure 4:
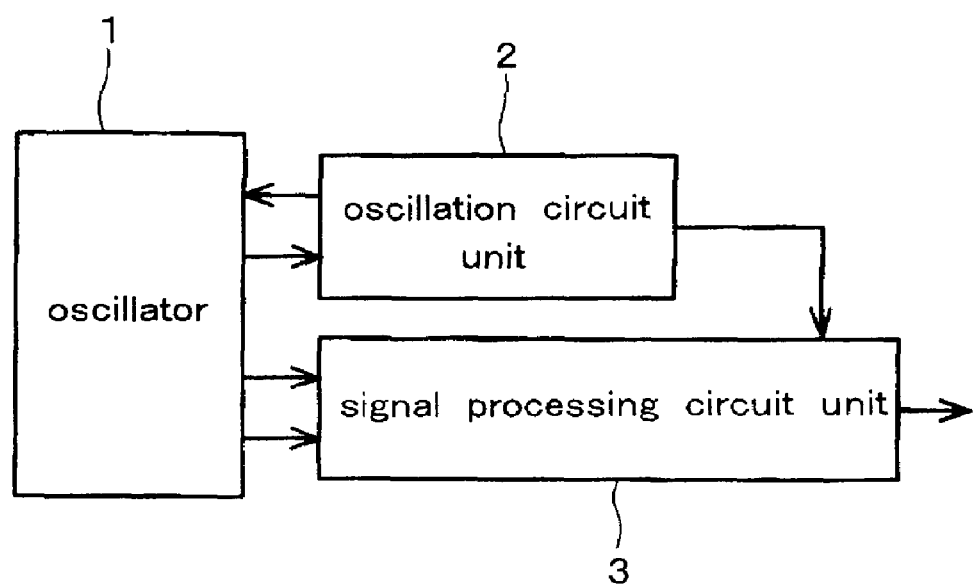
FIG. 4 is a block diagram showing a schematic configuration of a conventional oscillation type inertial force sensor.

FIG. 3 is a block diagram showing the configuration of an oscillation type inertial force sensor according to a second preferred embodiment of the present invention. In FIG. 3, parts which are designated by the same reference numerals as those in FIG. 1 are substantially the same as or correspond to those in FIG. 1.

In the oscillation type inertial force sensor of the second preferred embodiment, the amplitude determining circuit 43 used in the first preferred embodiment is not used, and instead, a timer circuit 45 is provided, which counts the time from power-on to execute a control so that a processed signal is held at a predetermined potential for a period until predetermined time elapses.

Specifically, when variations are small for a period from power-on until the oscillation state of the oscillation circuit unit 2 is stabilized and the period can be sufficiently predicted, the amplitude determining circuit 43 in the first preferred embodiment may not be provided. The angular rate can be stably measured when the processed signal in the signal processing circuit unit 3 is held at a predetermined potential during the period from power-on until predetermined time which is counted elapses.

In the second preferred embodiment, the holding unit 4 is provided with the reference potential generating circuit 42, the timer circuit 45, the switching circuit 41, and the status notification output terminal 44. In a similar manner to where the amplitude determining circuit 43 is provided, as in the first preferred embodiment, the angular rate can be measured.

The oscillation type inertial force sensor of the second preferred embodiment is configured such that, as shown in FIG. 3, the timer circuit 45 is activated when the power source is turned on by the power source terminal 46, and starts counting. After a lapse of a predetermined amount of time, the time is up, and the timer circuit 45 outputs a time-up signal.

The switching circuit 41 is provided between the differential amplification circuit 33 and the synchronous detection circuit 35. When the time-up signal is output from the timer circuit 45, the switching circuit 41 switches the connection state from a state in which the reference potential generating circuit 42 and the synchronous detection circuit 35 are connected to a state in which the differential amplification circuit 33 and the synchronous detection circuit 35 are connected.

Since the remaining configuration is similar to that the first preferred embodiment shown in FIG. 1, to avoid repetition, the detailed description thereof is omitted.

In the oscillation type inertial force sensor of the second preferred embodiment, the timer circuit 45 is activated by power-on and begins counting. Until the timer circuit 45 times up, the synchronous detection circuit 35 is connected to the reference potential generating circuit 42 by the switching circuit 41, so that a constant reference potential Eo is applied to the synchronous detection circuit 35. In this case, when the input signal level is a constant value, the synchronous detection circuit 35 always outputs a signal of a constant potential. Consequently, the output of the signal processing circuit unit 3 is held at a constant reference potential, for example, about 2.5V as described above.

When a predetermined time in which an output of the oscillation circuit unit 2 is expected to be stabilized elapses, the timer circuit 45 times up and outputs a time-up signal. In response to the time-up signal, the switching circuit 41 switches to connect the differential amplification circuit 33 and the synchronous detection circuit 35. Consequently, the angular rate can be output. The time-up signal is supplied to the status notification output terminal 44 so that the fact that the oscillation state of the oscillation circuit unit 2 is stabilized is indicated.

In the second preferred embodiment, when an input signal has a constant value, the synchronous detection circuit 35 always outputs a signal having a constant potential. Consequently, the reference potential Eo generated from the reference potential generating circuit 42 does not always have to have a certain magnitude as in the first preferred embodiment but may be the ground potential.

In the first preferred embodiment, the switching circuit 41 is provided between the synchronous detection circuit 35 and the smoothing circuit 36 so that an output of the signal processing circuit unit 3 is held at a predetermined potential. In the second preferred embodiment, the switching circuit 41 is provided between the differential amplification circuit 33 and the synchronous detection circuit 35. The location of the switching circuit 41 is not limited to those in the first and second preferred embodiments, and may be optional as long as it is within a line through which the angular rate signal is transmitted in the signal processing circuit unit 3.

For example, the switching circuit 41 may be provided between the smoothing circuit 36 and the amplification circuit 37 at a posterior stage to the smoothing circuit 36 or after the amplification circuit 37. It is, however, desirable to provide the switching circuit 41 before the smoothing circuit 36 as in the first and second preferred embodiments to stabilize an output of the signal processing circuit unit 3 early by reducing the influence of the time constant of the smoothing circuit 36.

When a complicated circuit configuration is acceptable, the switching circuit 41 can be provided for each of the first and second signal converting circuits 31 and 32 before the differential amplification circuit 33. It is also possible to provide the switching circuits 41 between the first and second detecting units 11 and 12 and the signal converting circuits 31 and 32, respectively.

Although the electrostatic capacitance detection type oscillator is used as the oscillator 1 in the first and second preferred embodiments, the oscillator 1 is not limited to the electrostatic capacitance detection type oscillator in the present invention. For example, a tuning bar vibrator having a triangular-prism-shaped vibrating element may also be used.

When using the tuning bar vibrator, for example, the oscillating body 13 is formed in a triangular prism shape made of elinvar, ceramics, or other suitable material. The driving unit 14 is defined by a piezoelectric element, and the monitor unit 15 and the first and second detecting units 11 and 12 are shared.

In this case, a charge signal by the piezoelectric effect is output from the first and second detecting units 11 and 12. Consequently, I-V converting circuits for converting current to voltage are applied as the first and second signal converting circuits 31 and 32.

Furthermore, as the oscillator 1, not only an oscillator of an electrostatic capacitance detection type and a tuning bar vibrator, but also a fork oscillator and other suitable oscillator may be used.

Although the oscillation circuit unit 2 is defined by a self-excited oscillation circuit using the oscillator 1 as a resonance element in the first and second preferred embodiments, in the present invention, the oscillator circuit unit 2 is not limited to this configuration. For example, it is also possible to provide an oscillator on the outside and apply a forced oscillator for applying an oscillation output to the oscillator 1.

Although the angular rate sensor for detecting angular rate as the oscillation type inertial force sensor has been described as an example in the foregoing first and second preferred embodiments, the invention is not limited to the oscillation type inertial force sensor. The invention can be also applied to an acceleration sensor for detecting acceleration by using an oscillator.

As described above, according to the present invention, the oscillation type inertial force sensor is provided, capable of promptly starting measurement by shortening a period from power-on until a signal output becomes stable and, even when measurement starts in an unstable state, minimizing occurrence of a measurement error.

Therefore, the present invention can be widely applied to the field of an oscillation type inertial force sensor for use in a camera with an image stabilizer, a car navigation system, and other suitable devices.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An oscillation type inertial force sensor comprising:
an oscillator arranged to detect an inertial force;
an oscillation circuit unit arranged to drive the oscillator; and
a signal processing circuit unit arranged to generate a signal corresponding to a magnitude of the inertial force based on a detection output of the oscillator, the signal processing circuit comprising at least a synchronous detection circuit arranged to synchronous-detect a detection output of the oscillator, and a smoothing circuit arranged to smooth an output of the synchronous detection circuit; and
a holding unit arranged to hold a signal input to the smoothing circuit at a predetermined potential during a period immediately after power-on until operation of the oscillation circuit unit becomes stable in response to power-on.

2. The oscillation type inertial force sensor according to claim 1, wherein the holding unit includes an amplitude determining circuit arranged to monitor signal amplitude of the oscillation circuit unit and to perform a control so that the processed signal is held at the predetermined potential until the signal amplitude becomes equal to or greater than a predetermined value.

3. The oscillation type inertial force sensor according to claim 1, wherein the holding unit includes a timer circuit arranged to count the time from power-on and to perform a control so that the processed signal is held at the predetermined potential until predetermined time elapses.

4. The oscillation type inertial force sensor according to claim 1, wherein the predetermined potential held by the holding unit is set to correspond to a potential obtained as an output of the signal processing circuit unit when no inertial force is detected.

5. The oscillation type inertial force sensor according to claim 1, wherein the holding unit includes a status notification output terminal arranged to indicate the fact that an oscillation state of the oscillation circuit unit is stabilized.

* * * * *